US011540553B2

(12) United States Patent
Morales et al.

(10) Patent No.: US 11,540,553 B2
(45) Date of Patent: *Jan. 3, 2023

(54) LEGUME-BASED FOOD PRODUCTS

(71) Applicant: Mars, Incorporated, McLean, VA (US)

(72) Inventors: Cesar Vega Morales, McLean, VA (US); Ferdynand Szlachetko, McLean, VA (US)

(73) Assignee: Mars, Incorporated, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,577

(22) Filed: Jan. 18, 2019

(65) Prior Publication Data
US 2019/0150498 A1 May 23, 2019

Related U.S. Application Data

(63) Continuation of application No. 15/406,383, filed on Jan. 13, 2017, now Pat. No. 10,182,591.

(60) Provisional application No. 62/278,261, filed on Jan. 13, 2016.

(51) Int. Cl.
A23P 20/20 (2016.01)
A23P 20/25 (2016.01)
A23P 30/25 (2016.01)
A23L 11/00 (2021.01)
A23L 33/15 (2016.01)

(52) U.S. Cl.
CPC .............. *A23P 30/25* (2016.08); *A23L 11/05* (2016.08); *A23L 11/07* (2016.08); *A23L 33/15* (2016.08)

(58) Field of Classification Search
CPC .......... A23P 30/20; A23P 30/25; A23P 30/10; A23P 20/25; A23P 10/30; A23P 20/10; A23P 20/20; A23L 7/126; A23L 13/03; A23L 11/05; A23L 11/07
See application file for complete search history.

(56) References Cited

U.S. PATENT DOCUMENTS

| 4,275,647 A * | 6/1981 | Chambers .............. A21C 9/061 426/138 |
| 8,900,649 B1 | 12/2014 | Chen et al. |
| 9,119,410 B2 | 9/2015 | Kino et al. |
| 11,178,892 B2 * | 11/2021 | Vegas Morales ....... A23L 11/07 |

(Continued)

FOREIGN PATENT DOCUMENTS

| CN | 1190545 A | 8/1998 |
| CN | 101507444 A | 8/2009 |

(Continued)

OTHER PUBLICATIONS

International Search Report and Written Opinion from International Application No. PCT/IB2017/013502 dated Mar. 27, 2017, 11 pgs.

*Primary Examiner* — Hong T Yoo
(74) *Attorney, Agent, or Firm* — Baker Botts L.L.P.

(57) ABSTRACT

The present invention, in an embodiment, is a product having an outer shell and an inner filling. In the embodiment, each of the outer shell and inner filling include a legume and an additive such as vitamins and minerals. In the embodiment, the outer shell and the inner filling are substantially free of grain-based flour, the product is a ready-to-eat food, the outer shell is crispy, and the inner filling is creamy.

16 Claims, 6 Drawing Sheets

(56) References Cited

U.S. PATENT DOCUMENTS

| | | |
|---|---|---|
| 2002/0098267 A1 | 7/2002 | Conrad Heisey et al. |
| 2003/0219514 A1 | 11/2003 | Jones et al. |
| 2005/0186308 A1 | 8/2005 | Wada |
| 2006/0153965 A1 | 7/2006 | Borders et al. |
| 2008/0182007 A1 | 7/2008 | Barnett et al. |
| 2010/0239720 A1 | 9/2010 | Jensen et al. |
| 2013/0022732 A1 | 1/2013 | Khan et al. |
| 2014/0120208 A1* | 5/2014 | Mateus .................. A23L 7/126 426/2 |
| 2014/0147555 A1 | 5/2014 | Bilet et al. |
| 2015/0250190 A1 | 9/2015 | Vemulapalli et al. |
| 2015/0351434 A1* | 12/2015 | Fase, Jr. .................... A23L 1/39 426/102 |

FOREIGN PATENT DOCUMENTS

| | | |
|---|---|---|
| EP | 2709467 A1 | 3/2014 |
| KR | 20100038929 A | 4/2010 |
| KR | 20120116603 A | 10/2012 |
| WO | 2004016116 A1 | 2/2004 |
| WO | 2007044943 A1 | 4/2007 |
| WO | 2015126871 A1 | 8/2015 |
| WO | 2016140881 A1 | 9/2016 |

* cited by examiner

LEGUME-BASED FOOD PRODUCTS

RELATED APPLICATIONS

This application is a continuation of U.S. patent application Ser. No. 15/406,383, filed Jan. 13, 2017, which claims the benefit of U.S. Provisional Application No. 62/278,261, filed Jan. 13, 2016, which are incorporated by reference herein in their entirety for all purposes.

TECHNICAL FIELD

The present invention relates to legume-based food products.

BACKGROUND

In developing countries, malnutrition is partially driven by a diet poor in protein and the poor quality of available proteins. Optimal growth and cognitive development of people and specifically children depends on protein quality and key micronutrient (bio)availability.

Legumes are part of the cultural food repertoire of many countries including India. The legumes are eaten in a variety of ways. For example, the legumes may be eaten as a topping in poha or dal to a variety of snacks such as chikki (peanut brittle), sev (extruded, then fried chickpeas), coated-then-fried peanuts, to rolled chickpeas.

Embodiments of the current invention include ready to eat legume-based extruded pillows filled with a legume-based cream. The properties (size, porosity, color, dough rheology) of the legume-based shell and cream are driven by changing composition and enable a series of eating experiences—from small, dense and crunchy to big, highly expanded and crispy shells.

Embodiments of the invention have the potential to become a relevant vehicle for protein and micronutrient delivery. The product falls within a highly relevant category (savory snacks) which as of today does not offer a desirable nutritional profile.

SUMMARY OF INVENTION

In embodiments, the product comprises an outer shell comprising: at least one first legume, and at least one first additive selected from the group consisting of vitamins and minerals; wherein the at least one additive is not a part of the at least one first legume; and an inner filling comprising: at least one second legume, and at least one second additive selected from the group consisting of vitamins and minerals; wherein the at least one second additive is not a part of the at least one second legume; wherein at least one of the outer shell and the inner filling is substantially free of grain-based flour; wherein the product is a ready-to-eat food; and wherein the outer shell is crispy and the inner filling is creamy.

In another embodiments, the at least one first additive and the at least one second additive are selected from the group consisting of iron, vitamins A, B1, B2, B6, B12, C, D, D3, folic acid, thiamin, riboflavin, niacin, zinc, and combinations thereof.

In other embodiments, the at least one first legume is a pulse.

In yet another embodiments, the at least one first legume is selected from the group consisting of chickpea, green pea, yellow pea, black eyed peas, pinto bean, kidney bean, black bean, mung bean, adzuki bean, fava bean, edamame, green lentil, red lentil, black lentil, lupin and combinations thereof.

In the embodiments, the at least one first legume is at least one of peanut and soya.

In yet another embodiment, the at least one first additive is selected from the group consisting of Vitamin B6, niacin, iron, zinc, and combinations thereof. In other embodiments, the at least one second additive is selected from the group consisting of Vitamins A, D3, B1, B2, C, B12, folic acid, and combinations thereof.

In some embodiments, the at least one second legume is a pulse. In some embodiments, the at least one second legume is selected from the group consisting of chickpea, green pea, yellow pea, black eyed peas, pinto bean, kidney bean, black bean, mung bean, adzuki bean, fava bean, edamame, green lentil, red lentil, black lentil, lupin and combinations thereof.

In some embodiments, the at least one second legume is at least one of peanut or soya.

In yet other embodiments, the at least one first legume and the at least one second legume are the same. In other embodiments, the at least one first legume and the at least one second legume are different.

In an embodiment, a bulk density of the product is 0.1 kg/liter to 2 kg/liter.

In another embodiment, a shape of the product is selected from the group consisting of triangular, rectangular, square, and rhomboid.

In yet another embodiment, the product is free of at least one of high fructose corn syrup, dairy-based components, enzymes or gluten. In yet other embodiments, the product is free of high fructose corn syrup, dairy-based components, enzymes and gluten.

In some embodiments, the outer shell is 40 weight percent to 80 weight percent of the product.

In yet other embodiments, the product further comprises an oil layer and wherein the oil layer coats at least a portion of the outer shell.

In an embodiment, the product comprises an outer shell comprising: at least one first legume, and at least one first additive selected from the group consisting of vitamins and minerals; wherein the at least one additive is not a part of the at least one first legume; and an inner filling comprising: at least one second legume, and at least one second additive selected from the group consisting of vitamins and minerals; wherein the at least one second additive is not a part of the at least one second legume; wherein the product is a ready-to-eat food; wherein the outer shell is crispy and the inner filling is creamy; and wherein, when the product is tested by exposing the product to 21 degrees Celsius and a relative humidity of 44% for 2 weeks, a peak fracture force of the product is at least 1,200 grams. In another embodiment, when the product is tested by exposing the product to 21 degrees Celsius and a relative humidity of 44% for 2 weeks, an acoustic peak count of the product is at least 10. In the embodiment, the at least one of the outer shell and the inner filling is substantially free of grain-based flour.

In yet another embodiment, the product comprises an outer shell comprising: at least one first legume, and at least one first additive selected from the group consisting of vitamins and minerals; wherein the at least one additive is not a part of the at least one first legume and an inner filling comprising: at least one second legume, and at least one second additive selected from the group consisting of vitamins and minerals; wherein the at least one second additive is not a part of the at least one second legume; wherein the product is a ready-to-eat food; wherein the outer shell is crispy and the inner filling is creamy; and wherein a water content of the outer shell is at least 50% greater than the water content of the filling.

Figure 1:
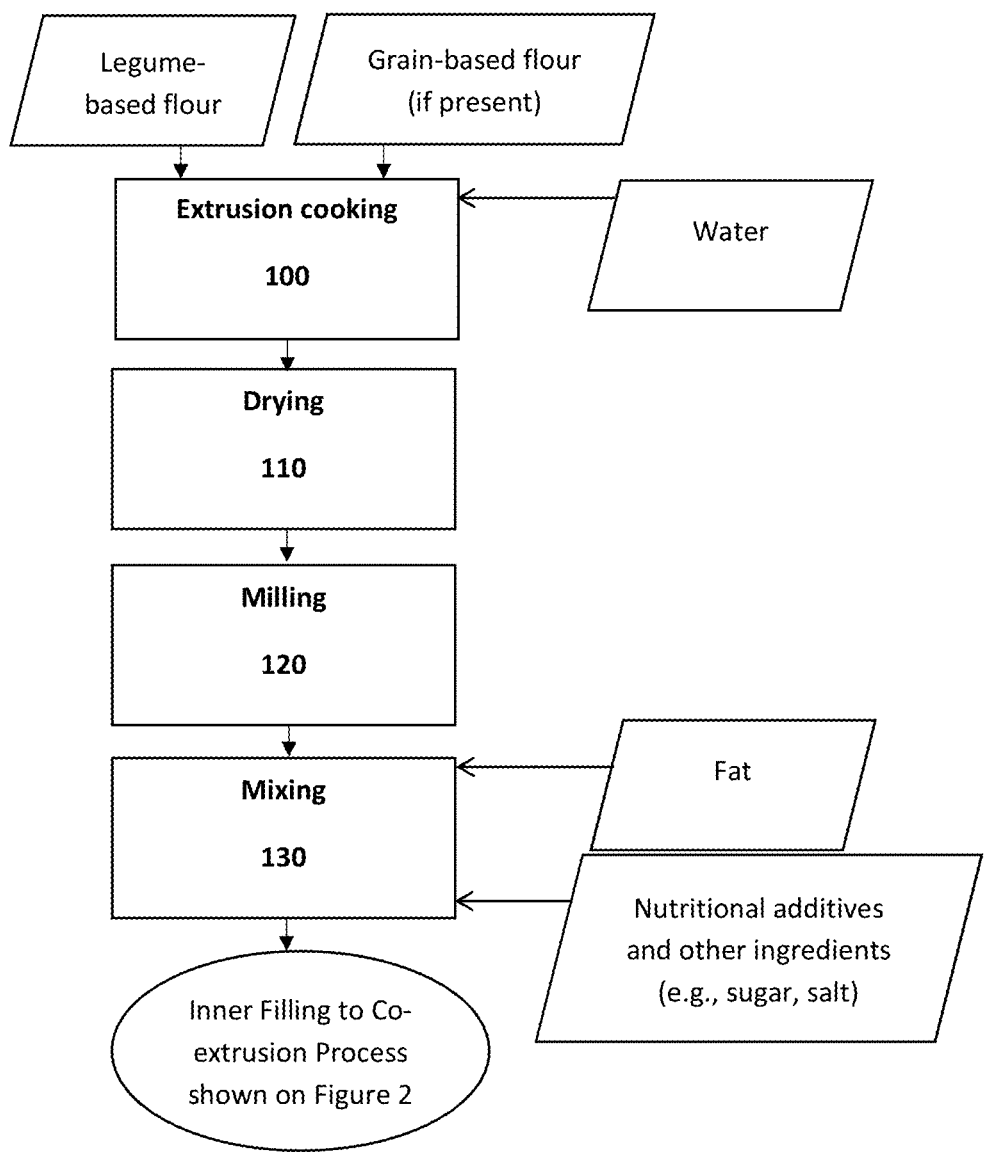
FIG. 1 illustrates features of some embodiments of the present invention.

The present invention will be further explained with reference to the attached drawings, wherein like structures are referred to by like numerals throughout the several views. The drawings shown are not necessarily to scale or aspect ratio, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

In embodiments, the present invention is ready-to-eat, shelf stable products in the form of a filled pillow having a legume-based outer shell and an inner legume-based filling. In embodiments, the legume-based filled pillow products have a crispy outer shell and a creamy-texture inner filling. In some embodiments, the products remain crispy when exposed to high moisture environments over time. In the embodiments, the products, when consumed, provide a significant amount of high quality protein, fiber and nutrients.

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for additional factors not described, unless the context clearly dictates otherwise. In addition, throughout the specification, the meaning of "a," "an," and "the" include plural references. The meaning of "in" includes "in" and "on."

As used herein, the term "substantially free" means less than 5%.

As used herein, the term "free" means 0%.

As used herein, the term "organoleptic properties" includes the flavor display, texture, and sound of a food that are experienced by the eater of said food when said food is eaten.

As used herein, the term "single serving" means any quantity of food sold, marketed, described, advertised, or implied to be equivalent to a single serving size or unit. For example, in the U.S., single serving sizes for foods are defined in the FDA Labeling Rules as contained in 21 CFR § 101.12 which is incorporated herein by reference in its entirety.

As used herein, the term "fat" refers to the total amount of digestible, partially digestible and nondigestible fats or oils that are present in the embodiments of the present invention. As used herein, the terms "lipid", "fat" and "oil" are synonymous.

As used herein, the term "carbohydrate" refers to the total amount of sugar alcohols, monosaccharides, disaccharides, oligosaccharides, digestible, partially digestible and non-digestible polysaccharides; and lignin or lignin like materials that are present in the embodiments of the present invention.

As used herein, the term "ready-to-eat" when used to describe a food, means that after manufacture and packaging, the food product requires no additional processing, including but not limited to cooking, baking, microwaving, boiling, frying; or combination with components outside of the product's packaging to achieve the novel combination of balanced nutrition and taste that Applicants are claiming. However, this does not rule out that one or all of the parameters of Applicants' invention, for example, balanced nutrition, convenience and taste, may be improved when said compositions are processed further or combined with other foods.

In embodiments, a product is determined to be "crispy" by texture measurements using an Instron texture analyzer or equivalent. In other embodiments, a product is determined to be "crispy" based on organoleptic properties and/or mouthfeel. In yet other embodiments, a product is determined to be "crispy" based on an acoustic peak count of at least 10 as determined by the Acoustic Crispiness Test Procedure detailed herein. In yet other embodiments, a product is determined to be "crispy" based on a peak fracture force of at least 1,200 grams as determined by the Force Crispiness Test Procedure detailed herein.

As used herein, a product is determined to be "creamy" based on viscosity measurements using a Brookfield viscometer and/or a stress-controlled rheometer equipped with a tribology probe or equivalent. In other embodiments, a product is determined to be creamy based on organoleptic properties and/or mouthfeel.

As used herein, the "shelf life" of a product is determined based on the change in organoleptic properties of a food or drink in barrier packaging over time.

As used herein, the term "seasoning" means salt, herbs and/or spices added to a food product to enhance flavor. In some embodiments, the average particle size of the "seasoning" is reduced to 1 micron to 1000 microns via milling or other size reduction process.

As used herein, the term "legume" means a fruit or seed of leguminous plants.

As used herein, the phrase "legume-based flour" means a powder formed from milling one or more legumes.

As used herein, the term "grain" means edible seeds of grasses. The term "grain" and "cereal" are used interchangeably herein. Non-limiting examples of grains include rice, teff, sorghum, corn, millet, wheat, quinoa, and farro.

As used herein, the phrase "grain-based flour" means a powder formed from milling grains.

As used herein, the term "pulse" means the dried seed of a legume.

As used herein, the phrase "water content" or "moisture content" of a product means the weight percent of water in the product, on a wet basis.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual by-products, which may be present in commercially available sources.

Products

In embodiments, the present disclosure relates to ready-to-eat, shelf stable products in the form of a filled pillow having a legume-based outer shell and an inner filling of legume-based cream. In embodiments, the legume-based filled pillow products have a crispy outer shell and a creamy inner filling.

In embodiments, the product comprises an outer shell comprising: at least one first legume, and at least one first additive selected from the group consisting of vitamins and minerals; wherein the at least one additive is not a part of the at least one first legume; and an inner filling comprising: at least one second legume, and at least one second additive selected from the group consisting of vitamins and minerals; wherein the at least one second additive is not a part of the at least one second legume; wherein at least one of the outer shell and the inner filling is substantially free of grain-based flour; wherein the product is a ready-to-eat food; and wherein the outer shell is crispy and the inner filling is creamy.

In another embodiments, the at least one first additive and the at least one second additive are selected from the group consisting of iron, vitamins A, B1, B2, B6, B12, C, D, D3, folic acid, thiamin, riboflavin, niacin, zinc, and combinations thereof.

In other embodiments, the at least one first legume is a pulse.

In yet another embodiments, the at least one first legume is selected from the group consisting of chickpea, green pea, yellow pea, black eyed peas, pinto bean, kidney bean, black bean, mung bean, adzuki bean, fava bean, edamame, green lentil, red lentil, black lentil, lupin and combinations thereof.

In the embodiments, the at least one first legume is at least one of peanut and soya.

In yet another embodiment, the at least one first additive is selected from the group consisting of Vitamin B6, niacin, iron, zinc, and combinations thereof. In other embodiments, the at least one second additive is selected from the group consisting of Vitamins A, D3, B1, B2, C, B12, folic acid, and combinations thereof.

In some embodiments, the at least one second legume is a pulse. In some embodiments, the at least one second legume is selected from the group consisting of chickpea, green pea, yellow pea, black eyed peas, pinto bean, kidney bean, black bean, mung bean, adzuki bean, fava bean, edamame, green lentil, red lentil, black lentil, lupin and combinations thereof.

In some embodiments, the at least one second legume is at least one of peanut or soya.

In yet other embodiments, the at least one first legume and the at least one second legume are the same. In other embodiments, the at least one first legume and the at least one second legume are different.

In an embodiment, a bulk density of the product is 0.1 kg/liter to 2 kg/liter.

In another embodiment, a shape of the product is selected from the group consisting of triangular, rectangular, square, and rhomboid.

In yet another embodiment, the product is free of at least one of high fructose corn syrup, dairy-based components, enzymes or gluten.

In some embodiments, the outer shell is 40 weight percent to 80 weight percent of the product.

In yet other embodiments, the product further comprises an oil layer and wherein the oil layer coats at least a portion of the outer shell.

In an embodiment, the product comprises an outer shell comprising: at least one first legume, and at least one first additive selected from the group consisting of vitamins and minerals; wherein the at least one additive is not a part of the at least one first legume; and an inner filling comprising: at least one second legume, and at least one second additive selected from the group consisting of vitamins and minerals; wherein the at least one second additive is not a part of the at least one second legume; wherein the product is a ready-to-eat food; the outer shell is crispy and the inner filling is creamy; and wherein, when the product is tested by exposing the product to 21 degrees Celsius and a relative humidity of 44% for 2 weeks, a peak fracture force of the product is at least 1,200 grams. In another embodiment, when the product is tested by exposing the product to 21 degrees Celsius and a relative humidity of 44% for 2 weeks, an acoustic peak count of the product is at least 10. In the embodiment, the at least one of the outer shell and the inner filling is substantially free of grain-based flour.

In yet another embodiment, the product comprises an outer shell comprising: at least one first legume, and at least one first additive selected from the group consisting of vitamins and minerals; wherein the at least one additive is not a part of the at least one first legume and an inner filling comprising: at least one second legume, and at least one second additive selected from the group consisting of vitamins and minerals; wherein the at least one second additive is not a part of the at least one second legume; wherein the product is a ready-to-eat food; wherein the outer shell is crispy and the inner filling is creamy; and wherein a water content of the outer shell is at least 50% greater than the water content of the filling.

In an embodiment, the outer shell and/or the inner filling include at least one legume. In the embodiment, the at least one legume is in the form of a legume-based flour. In the embodiment, the at least one legume may include, but is not limited to, chickpea, green pea, yellow pea, black eyed peas, pinto bean, kidney bean, black bean, mung bean, adzuki bean, fava bean, green lentil, red lentil, black lentil, lupin and combinations thereof. In some embodiments, the at least one legume in the outer shell and/or inner filling includes, but is not limited to at least one of peanut and soya. In yet another embodiment, the at least one legume is a pulse.

In embodiments, the outer shell and/or inner filling may include one or more legumes having a low fat content such as pinto, black, kidney, mung bean, black-eyed pea, adzuki bean, fava bean, red, black, green lentils, chickpea, and peas (green and others). In the embodiments, the outer shell and/or inner filling may include one or more legumes having a relative high fat content such as peanut or soya. In some embodiments, the outer shell may include a high fat legume in the form of a defatted flour. In other embodiments, the inner filling may include a high fat legume in the form of a cream.

In some embodiments, the inner filling can include different legumes, mixes of legumes and various fats.

In embodiments, the product may further include at least one additive included in the outer shell and/or the inner filling. In the embodiments, the additive includes, but is not limited to, at least one vitamin or mineral. In other embodiments, the additive may include, but is not limited to, iron, vitamins A, B1, B2, B6, B12, C, D, D3, folic acid, thiamine, riboflavin, niacin, and zinc. In embodiments, the inner filling includes at least one additive selected from Vitamins A, D3, B1, B2, C and folic acid. In the embodiments, the outer shell includes at least one additive selected from the Vitamin B6, niacin, iron and zinc. Table 1 shows a non-limiting example of the additives and associated amounts included in 50 grams of the product:

TABLE 1

| Additive | Amount per 50 gram serving |
| --- | --- |
| Iron (NaFeEDTA) | 5-10 mg |
| B12 | 1-2 µg |
| Vit C | 40-80 mg |
| Vit A | 150-400 RAE |

TABLE 1-continued

| Additive | Amount per 50 gram serving |
| --- | --- |
| Folate | 45-90 µg |
| Vit D | 60-260 IU |
| Thiamin | 0.4-0.8 mg |
| Riboflavin | 0.5-1 mg |
| Niacin | 0.5-1 mg |
| Vitamin B6 | 0.5-1 mg |
| Zinc (as sulphate) | 4-8 mg |

In yet another embodiment, the at least one additive in the outer shell and/or filling is seasoning.

In embodiments, the outer shell is substantially free of grain-based flour. In embodiments, the inner filling is substantially free of grain-based flour. In other embodiments, the outer shell and/or inner filling is free of grain-based flour.

In yet other embodiments, the outer shelling and/or the inner filling includes at least one grain-based flour or cereal. In yet other embodiments, the at least one additive in the outer shell and/or filling is a cereal. In some embodiments, the cereal may include, but is not limited to, rice, teff, sorghum, corn, millet, wheat, quinoa, and/or farro. In some embodiments, the grain-based flour or cereal is added to reduce the density of the products.

In some embodiments, the outer shell and/or the inner filling includes one or more natural, natural-identical or artificial dye. In some embodiments, the outer shell and/or the inner filling includes one or more natural, natural-identical or artificial flavorings. In some embodiments, the outer shell and/or inner filling includes one or more emulsifiers. In some embodiments, the one or more emulsifier may include soy lecithin. In some embodiments, the product further comprises salt.

In yet another embodiment, the outer shell and/or inner filling further comprises sugar.

In another embodiment, the outer shell and/or the inner filling is substantially free of high fructose corn syrup. In yet other embodiments, the outer shell and/or inner filling is substantially free of emulsifiers. In another embodiment, the outer shell and/or inner filling is substantially free of enzymes. In other embodiment, the outer shell and/or inner filling is substantially free of gluten. In yet other embodiments, the outer shell and/or inner filling is substantially free of high fructose corn syrup, emulsifiers, enzymes, and gluten.

In yet other embodiments, the outer shell and/or the inner filling is substantially free of chocolate, chocolate-containing ingredients, cocoa, cocoa powder, cocoa cake, chocolate liquor, or mixtures thereof. In another embodiment, the outer shell and/or inner filling is substantially free of cocoa butter. In yet other embodiments, the outer shell and/or inner filling is substantially free of chocolate, chocolate-containing ingredients, cocoa, cocoa powder, cocoa cake, chocolate liquor, and cocoa butter.

In another embodiment, the outer shell and/or the inner filling is free of high fructose corn syrup. In yet other embodiments, the outer shell and/or inner filling is free of emulsifiers. In another embodiment, the outer shell and/or inner filling is free of enzymes. In other embodiment, the outer shell and/or inner filling is free of gluten. In yet other embodiments, the outer shell and/or inner filling is free of high fructose corn syrup, emulsifiers, enzymes, and gluten.

In yet other embodiments, the outer shell and/or the inner filling is free of chocolate, chocolate-containing ingredients, cocoa, cocoa powder, cocoa cake, chocolate liquor, cocoa butter or mixtures thereof. In another embodiment, the outer shell and/or inner filling is free of cocoa butter. In yet other embodiments, the outer shell and/or inner filling is free of chocolate, chocolate-containing ingredients, cocoa, cocoa powder, cocoa cake, chocolate liquor, and cocoa butter.

In embodiments, the product has a crispy outer shell and a creamy inner filling. In some embodiments, the product is a cream-filled pillow.

In an embodiment, the outer shell coats a 100% of the inner filling. In other embodiments, the outer shell coats less than 100% of the inner filling.

In another embodiment, the product further includes an oil layer and wherein the oil layer coats at least a portion of the outer shell. In embodiments, the oil layer coats the entire outer shell. In some embodiments, the oil layer coats less than 50% of the surface area of the outer shell. In other embodiments, the oil layer comprises a vegetable oil. In some embodiments, the vegetable oil is sunflower oil, palm oil, peanut oil, canola oil, or mixtures thereof.

In some embodiments, the product is at least partially coated with seasoning. In embodiments, the seasoning may include spices such as masala, Andhra, red chutney, green chili, tomato, sweet curry, chili lime, sour cream, onion, paprika, and mixtures thereof. In yet other embodiments, the seasoning is selected based, at least in part, on the cultural tastes of the consumer where the product is being consumed.

In embodiments, the seasoning is mixed with the oil and coats at least a portion of the outer shell. In some embodiments, the seasoning mixed with the oil coats less than 50% of the surface area of the outer shell. In embodiments, the oil and/or seasoning coating layer is substantially evenly distributed on outer shell.

In yet other embodiments, the seasoning is mixed with the inner filling.

In some embodiments, the outer shell is 40 weight percent to 80 weight percent of the product. In yet other embodiments, the outer shell is 40 weight percent to 70 weight percent of the product. In yet other embodiments, the outer shell is 40 weight percent to 60 weight percent of the product. In yet other embodiments, the outer shell is 40 weight percent to 50 weight percent of the product. In yet other embodiments, the outer shell is 50 weight percent to 80 weight percent of the product. In yet other embodiments, the outer shell is 60 weight percent to 80 weight percent of the product. In yet other embodiments, the outer shell is 70 weight percent to 80 weight percent of the product. In yet other embodiments, the outer shell is 50 weight percent to 70 weight percent of the product.

In yet other embodiments, the inner filling is 20 weight percent to 60 weight percent of the product. In yet other embodiments, the inner filling is 20 weight percent to 50 weight percent of the product. In yet other embodiments, the inner filling is 20 weight percent to 40 weight percent of the product. In yet other embodiments, the inner filling is 20 weight percent to 30 weight percent of the product. In yet other embodiments, the inner filling is 30 weight percent to 60 weight percent of the product. In yet other embodiments, the inner filling is 40 weight percent to 60 weight percent of the product. In yet other embodiments, the inner filling is 50 weight percent to 60 weight percent of the product. In yet other embodiments, the inner filling is 30 weight percent to 50 weight percent of the product.

In some embodiments, the oil layer is 1 weight percent to 15 weight percent of the product. In some embodiments, the oil layer is 1 weight percent to 10 weight percent of the product. In some embodiments, the oil layer is 1 weight percent to 8 weight percent of the product. In some embodiments, the oil layer is 1 weight percent to 7 weight percent of the product. In some embodiments, the oil layer is 1 weight percent to 5 weight percent of the product. In some embodiments, the oil layer is 1 weight percent to 3 weight percent of the product. In some embodiments, the oil layer is 3 weight percent to 15 weight percent of the product. In some embodiments, the oil layer is 5 weight percent to 15 weight percent of the product. In some embodiments, the oil layer is 7 weight percent to 15 weight percent of the product. In some embodiments, the oil layer is 8 weight percent to 15 weight percent of the product. In some embodiments, the oil layer is 10 weight percent to 15 weight percent of the product. In some embodiments, the oil layer is 2 weight percent to 8 weight percent of the product. In some embodiments, the oil layer is 5 weight percent to 10 weight percent of the product. In some embodiments, the oil layer is 3 weight percent to 5 weight percent of the product.

In some embodiments, the seasoning is 1 weight percent to 15 weight percent of the product. In some embodiments, the seasoning is 1 weight percent to 12 weight percent of the product. In some embodiments, the seasoning is 1 weight percent to 10 weight percent of the product. In some embodiments, the seasoning is 1 weight percent to 8 weight percent of the product. In some embodiments, the seasoning is 1 weight percent to 7 weight percent of the product. In some embodiments, the seasoning is 1 weight percent to 5 weight percent of the product. In some embodiments, the seasoning is 1 weight percent to 3 weight percent of the product. In some embodiments, the seasoning is 3 weight percent to 15 weight percent of the product. In some embodiments, the seasoning is 5 weight percent to 15 weight percent of the product. In some embodiments, the seasoning is 7 weight percent to 15 weight percent of the product. In some embodiments, the seasoning is 8 weight percent to 15 weight percent of the product. In some embodiments, the seasoning is 10 weight percent to 15 weight percent of the product. In some embodiments, the seasoning is 12 weight percent to 15 weight percent of the product. In some embodiments, the seasoning is 2 weight percent to 8 weight percent of the product. In some embodiments, the seasoning is 5 weight percent to 10 weight percent of the product. In some embodiments, the seasoning is 3 weight percent to 5 weight percent of the product.

In embodiments, the product includes 40 weight percent to 50 weight percent outer shell, 40 weight percent to 50 weight percent inner filling, 5 weight percent to 10 weight percent seasoning and 5 weight percent to 10 weight percent oil, wherein the seasoning and the oil form a coating on the outer shell of the product. In embodiments, the product includes 40 weight percent to 45 weight percent outer shell, 40 weight percent to 45 weight percent inner filling, 5 weight percent to 8 weight percent seasoning and 5 weight percent to 8 weight percent oil, wherein the seasoning and the oil form a coating on the outer shell of the product. In embodiments, the product includes 43 weight percent to 45 weight percent outer shell, 43 weight percent to 45 weight percent inner filling, 6 weight percent to 7 weight percent seasoning and 6 weight percent to 7 weight percent oil, wherein the seasoning and the oil form a coating on the outer shell of the product.

In some embodiments, the product further includes at least one cereal detailed herein. In the embodiments, the at least one cereal is 1 weight percent to 25 weight percent of the product. In the embodiments, the at least one cereal is 3 weight percent to 25 weight percent of the product. In the embodiments, the at least one cereal is 8 weight percent to 25 weight percent of the product. In the embodiments, the at least one cereal is 10 weight percent to 25 weight percent of the product. In the embodiments, the at least one cereal is 15 weight percent to 25 weight percent of the product. In the embodiments, the at least one cereal is 20 weight percent to 25 weight percent of the product. In the embodiments, the at least one cereal is 1 weight percent to 20 weight percent of the product. In the embodiments, the at least one cereal is 1 weight percent to 15 weight percent of the product. In the embodiments, the at least one cereal is 1 weight percent to 10 weight percent of the product. In the embodiments, the at least one cereal is 1 weight percent to 8 weight percent of the product. In the embodiments, the at least one cereal is 1 weight percent to 3 weight percent of the product. In the embodiments, the at least one cereal is 3 weight percent to 20 weight percent of the product. In the embodiments, the at least one cereal is 8 weight percent to 15 weight percent of the product. In the embodiments, the at least one cereal is 10 weight percent to 15 weight percent of the product. In the embodiments, the at least one cereal is 10 weight percent of the product. In the embodiments, the at least one cereal is 15 weight percent of the product. In yet other embodiments, the product is substantially free of cereal. In yet other embodiments, the product is free of cereal.

In embodiments, when the product, as described in one or more embodiments herein, is tested by exposing the product to a sufficient temperature and a sufficient relative humidity to result in the product having a moisture content of 5 weight percent, the product is crispy. In embodiments, when the product, as described in one or more embodiments herein, is tested by exposing the product to a sufficient temperature and a sufficient relative humidity to result in the product having a moisture content of 4.5 weight percent, the product is crispy. In embodiments, when the product, as described in one or more embodiments herein, is tested by exposing the product to a sufficient temperature and a sufficient relative humidity to result in the product having a moisture content of 5.5 weight percent, the product is crispy. In embodiments, when the product, as described in one or more embodiments herein, is tested by exposing the product to a sufficient temperature and a sufficient relative humidity to result in the product having a moisture content of 4 weight percent, the product is crispy. In embodiments, when the product, as described in one or more embodiments herein, is tested by exposing the product to a sufficient temperature and a sufficient relative humidity to result in the product having a moisture content of 3.5 weight percent, the product is crispy. In embodiments, when the product, as described in one or more embodiments herein, is tested by exposing the product to a sufficient temperature and a sufficient relative humidity to result in the product having a moisture content of 3 weight percent, the product is crispy. In embodiments, when the product, as described in one or more embodiments herein, is tested by exposing the product to a sufficient temperature and a sufficient relative humidity to result in the product having a moisture content of 2.5 weight percent, the product is crispy.

In embodiments, when the product, as described in one or more embodiments herein, is tested by exposing the product to 21 degrees Celsius and a relative humidity of 44% for 2 weeks, a peak fracture force of the product is at least 1,200 grams the product. In embodiments, when the product, as described in one or more embodiments herein, is tested by exposing the product to 21 degrees Celsius and a relative humidity of 44% for 2 weeks, a peak fracture force of the product is at least 1,250 grams the product. In embodiments, when the product, as described in one or more embodiments herein, is tested by exposing the product to 21 degrees Celsius and a relative humidity of 44% for 2 weeks, a peak fracture force of the product is at least 1,300 grams the product. In embodiments, when the product, as described in one or more embodiments herein, is tested by exposing the product to 21 degrees Celsius and a relative humidity of 44% for 2 weeks, a peak fracture force of the product is at least 1,350 grams the product. In embodiments, when the product, as described in one or more embodiments herein, is tested by exposing the product to 21 degrees Celsius and a relative humidity of 44% for 2 weeks, a peak fracture force of the product is at least 1,400 grams the product. In embodiments, when the product, as described in one or more embodiments herein, is tested by exposing the product to 21 degrees Celsius and a relative humidity of 44% for 2 weeks, a peak fracture force of the product is at least 1,450 grams the product. In embodiments, when the product, as described in one or more embodiments herein, is tested by exposing the product to 21 degrees Celsius and a relative humidity of 44% for 2 weeks, a peak fracture force of the product is at least 1,500 grams the product. In embodiments, when the product, as described in one or more embodiments herein, is tested by exposing the product to 21 degrees Celsius and a relative humidity of 44% for 2 weeks, a peak fracture force of the product is at least 1,550 grams the product. In embodiments, when the product, as described in one or more embodiments herein, is tested by exposing the product to 21 degrees Celsius and a relative humidity of 44% for 2 weeks, a peak fracture force of the product is at least 1,650 grams the product. In embodiments, when the product, as described in one or more embodiments herein, is tested by exposing the product to 21 degrees Celsius and a relative humidity of 44% for 2 weeks, a peak fracture force of the product is at least 1,700 grams the product. In embodiments, when the product, as described in one or more embodiments herein, is tested by exposing the product to 21 degrees Celsius and a relative humidity of 44% for 2 weeks, a peak fracture force of the product is at least 1,750 grams the product. In embodiments, when the product, as described in one or more embodiments herein, is tested by exposing the product to 21 degrees Celsius and a relative humidity of 44% for 2 weeks, a peak fracture force of the product is at least 1,800 grams the product. In embodiments, when the product, as described in one or more embodiments herein, is tested by exposing the product to 21 degrees Celsius and a relative humidity of 44% for 2 weeks, a peak fracture force of the product is at least 1,900 grams the product. In embodiments, when the product, as described in one or more embodiments herein, is tested by exposing the product to 21 degrees Celsius and a relative humidity of 44% for 2 weeks, a peak fracture force of the product is at least 2,000 grams the product. In embodiments, when the product, as described in one or more embodiments herein, is tested by exposing the product to 21 degrees Celsius and a relative humidity of 44% for 2 weeks, a peak fracture force of the product is at least 2,100 grams the product. In embodiments, when the product, as described in one or more embodiments herein, is tested by exposing the product to 21 degrees Celsius and a relative humidity of 44% for 2 weeks, a peak fracture force of the product is at least 2,200 grams the product. In embodiments, when the product, as described in one or more embodiments herein, is tested by exposing the product to 21 degrees Celsius and a relative humidity of 44% for 2 weeks, a peak fracture force of the product is at least 2,300 grams the product.

In embodiments, when the product, as described in one or more embodiments herein, is tested by exposing the product to 21 degrees Celsius and a relative humidity of 44% for 2 weeks, an acoustic peak count of the product is at least 10. In embodiments, when the product, as described in one or more embodiments herein, is tested by exposing the product to 21 degrees Celsius and a relative humidity of 44% for 2 weeks, an acoustic peak count of the product is at least 12. In embodiments, when the product, as described in one or more embodiments herein, is tested by exposing the product to 21 degrees Celsius and a relative humidity of 44% for 2 weeks, an acoustic peak count of the product is at least 15. In embodiments, when the product, as described in one or more embodiments herein, is tested by exposing the product to 21 degrees Celsius and a relative humidity of 44% for 2 weeks, an acoustic peak count of the product is at least 17. In embodiments, when the product, as described in one or more embodiments herein, is tested by exposing the product to 21 degrees Celsius and a relative humidity of 44% for 2 weeks, an acoustic peak count of the product is at least 19. In embodiments, when the product, as described in one or more embodiments herein, is tested by exposing the product to 21 degrees Celsius and a relative humidity of 44% for 2 weeks, an acoustic peak count of the product is at least 21. In embodiments, when the product, as described in one or more embodiments herein, is tested by exposing the product to 21 degrees Celsius and a relative humidity of 44% for 2 weeks, an acoustic peak count of the product is at least 23. In embodiments, when the product, as described in one or more embodiments herein, is tested by exposing the product to 21 degrees Celsius and a relative humidity of 44% for 2 weeks, an acoustic peak count of the product is at least 25.

In some embodiments, the product comprises an outer shell that is crispy, an inner filling that is creamy and a water content of the outer shell of the product is at least 20% greater than a water content of the inner filling. In some embodiments, the product comprises an outer shell that is crispy, an inner filling that is creamy and a water content of the outer shell of the product is at least 25% greater than a water content of the inner filling. In some embodiments, the product comprises an outer shell that is crispy, an inner filling that is creamy and a water content of the outer shell of the product is at least 30% greater than a water content of the inner filling. In some embodiments, the product comprises an outer shell that is crispy, an inner filling that is creamy and a water content of the outer shell of the product is at least 35% greater than a water content of the inner filling. In some embodiments, the product comprises an outer shell that is crispy, an inner filling that is creamy and a water content of the outer shell of the product is at least 40% greater than a water content of the inner filling. In some embodiments, the product comprises an outer shell that is crispy, an inner filling that is creamy and a water content of the outer shell of the product is at least 45% greater than a water content of the inner filling. In some embodiments, the product comprises an outer shell that is crispy, an inner filling that is creamy and a water content of the outer shell of the product is at least 50% greater than a water content of the inner filling. In some embodiments, the product comprises an outer shell that is crispy, an inner filling that is creamy and a water content of the outer shell of the product is at least 55% greater than a water content of the inner filling. In some embodiments, the product comprises an outer shell that is crispy, an inner filling that is creamy and a water content of the outer shell of the product is at least 60% greater than a water content of the inner filling. In some embodiments, the product comprises an outer shell that is crispy, an inner filling that is creamy and a water content of the outer shell of the product is at least 65% greater than a water content of the inner filling. In some embodiments, the product comprises an outer shell that is crispy, an inner filling that is creamy and a water content of the outer shell of the product is at least 70% greater than a water content of the inner filling. In some embodiments, the product comprises an outer shell that is crispy, an inner filling that is creamy and a water content of the outer shell of the product is at least 80% greater than a water content of the inner filling. In some embodiments, the product comprises an outer shell that is crispy, an inner filling that is creamy and a water content of the outer shell of the product is at least 90% greater than a water content of the inner filling. In some embodiments, the product comprises an outer shell that is crispy, an inner filling that is creamy and a water content of the outer shell of the product is at least 100% greater than a water content of the inner filling.

In some embodiments, a water activity of the outer shell is 0.05 to 0.4. In some embodiments, a water activity of the outer shell is 0.1 to 0.4. In some embodiments, a water activity of the outer shell is 0.2 to 0.4. In some embodiments, a water activity of the outer shell is 0.25 to 0.4. In some embodiments, a water activity of the outer shell is 0.3 to 0.4. In some embodiments, a water activity of the outer shell is 0.05 to 0.3. In some embodiments, a water activity of the outer shell is 0.05 to 0.25. In some embodiments, a water activity of the outer shell is 0.05 to 0.2. In some embodiments, a water activity of the outer shell is 0.05 to 0.1.

In some embodiments, a water activity of the inner filling is 0.05 to 0.3. In some embodiments, a water activity of the inner filling is 0.1 to 0.3. In some embodiments, a water activity of the inner filling is 0.2 to 0.3. In some embodiments, a water activity of the inner filling is 0.25 to 0.3. In some embodiments, a water activity of the inner filling is 0.05 to 0.25. In some embodiments, a water activity of the inner filling is 0.05 to 0.2. In some embodiments, a water activity of the inner filling is 0.05 to 0.1.

In some embodiments, an average particle size of the inner filling is 50 micrometers to 200 micrometers. In some embodiments, an average particle size of the inner filling is 70 micrometers to 200 micrometers. In some embodiments, an average particle size of the inner filling is 90 micrometers to 200 micrometers. In some embodiments, an average particle size of the inner filling is 100 micrometers to 200 micrometers. In some embodiments, an average particle size of the inner filling is 110 micrometers to 200 micrometers. In some embodiments, an average particle size of the inner filling is 130 micrometers to 200 micrometers. In some embodiments, an average particle size of the inner filling is 150 micrometers to 200 micrometers. In some embodiments, an average particle size of the inner filling is 170 micrometers to 200 micrometers.

In some embodiments, an average particle size of the inner filling is 50 micrometers to 170 micrometers. In some embodiments, an average particle size of the inner filling is 50 micrometers to 150 micrometers. In some embodiments, an average particle size of the inner filling is 50 micrometers to 130 micrometers. In some embodiments, an average particle size of the inner filling is 50 micrometers to 110 micrometers. In some embodiments, an average particle size of the inner filling is 50 micrometers to 90 micrometers. In some embodiments, an average particle size of the inner filling is 50 micrometers to 70 micrometers. In some embodiments, an average particle size of the inner filling is 60 micrometers to 170 micrometers. In some embodiments, an average particle size of the inner filling is 80 micrometers to 150 micrometers. In some embodiments, an average particle size of the inner filling is 100 micrometers to 130 micrometers. In some embodiments, an average particle size of the inner filling is 130 micrometers. In some embodiments, an average particle size of the inner filling is 150 micrometers.

In some embodiments, the shape of the product may include a closed pillow with rounded sides and flattened closed ends. In embodiments, the shape of the pillow may be triangular, rectangular, square or rhomboid. In some embodiments, the seasoning is visible in the outer shell. In other embodiments, the seasoning is not visible in the outer shell.

In some embodiments, the product is a ready-to-eat food. In other embodiments, the inner filling is a ready-to-eat food. In yet other embodiments, the outer shell is a ready-to-eat food.

In embodiments, the present invention is a plurality of products, wherein each product comprises an outer shell comprising: at least one first legume, and at least one first additive selected from the group consisting of vitamins and minerals; wherein the at least one additive is not a part of the at least one first legume; and an inner filling comprising: at least one second legume, and at least one second additive selected from the group consisting of vitamins and minerals; wherein the at least one second additive is not a part of the at least one second legume; wherein at least one of the outer shell and the inner filling is substantially free of grain-based flour; wherein the product is a ready-to-eat food; and wherein the outer shell is crispy and the inner filling is creamy In some embodiments, the bulk density of the product is based, at least in part, on the composition, shape and size of the product and/or the weight ratio of the outer shell to the inner filling. In an embodiment, the product has a bulk density of the product of 0.1 kg/liter to 2 kg/liter. In another embodiment, the product has a bulk density of the product of 0.1 kg/liter to 1.7 kg/liter. In yet another embodiment, the product has a bulk density of the product of 0.1 kg/liter to 1.3 kg/liter. In other embodiments, the product has a bulk density of the product of 0.1 kg/liter to 1.1 kg/liter. In another embodiment, the product has a bulk density of the product of 0.1 kg/liter to 0.9 kg/liter. In an embodiment, the product has a bulk density of the product of 0.1 kg/liter to 0.7 kg/liter. In another embodiment, the product has a bulk density of the product of 0.1 kg/liter to 0.5 kg/liter.

In an embodiment, the product has a bulk density of the product of 0.1 kg/liter to 2 kg/liter. In another embodiment, the product has a bulk density of the product of 0.3 kg/liter to 2 kg/liter. In yet another embodiment, the product has a bulk density of the product of 0.5 kg/liter to 2 kg/liter. In other embodiments, the product has a bulk density of the product of 0.7 kg/liter to 2 kg/liter. In another embodiment, the product has a bulk density of the product of 0.9 kg/liter to 2 kg/liter. In an embodiment, the product has a bulk density of the product of 1.1 kg/liter to 2 kg/liter. In another embodiment, the product has a bulk density of the product of 1.5 kg/liter to 2 kg/liter.

In another embodiment, the product has a bulk density of the product of 0.3 kg/liter to 1.5 kg/liter. In another embodiment, the product has a bulk density of the product of 0.5 kg/liter to 1.0 kg/liter. In another embodiment, the product has a bulk density of the product of 0.5 kg/liter. In another embodiment, the product has a bulk density of the product of 1.0 kg/liter.

In some embodiments, a weight of the product is 0.5 grams to 5 grams. In some embodiments, a weight of the product is 0.5 grams to 4 grams. In some embodiments, a weight of the product is 0.5 grams to 3 grams. In some embodiments, a weight of the product is 0.5 grams to 2 grams. In some embodiments, a weight of the product is 0.5 grams to 1 gram. In some embodiments, a weight of the product is 1 gram to 5 grams. In some embodiments, a weight of the product is 2 grams to 5 grams. In some embodiments, a weight of the product is 3 grams to 5 grams. In some embodiments, a weight of the product is 1 gram to 4 grams.

In embodiments, the size of a single serving of the product depends, at least in part, on the processing parameters and equipment such as die sizes, etc. In some embodiments, the size of the product ranges from 5×5×1 millimeters to 40×40×20 millimeters (length×width×height). In other embodiments, the size of the product ranges from 10×10×5 millimeters to 40×40×20 millimeters. In some embodiments, the size of the product ranges from 20×20×10 millimeters to 40×40×20 millimeters). In yet other embodiments, the size of the product ranges from 5×5×1 millimeters to 30×30×15 millimeters. In embodiments, the size of the product ranges from 5×5×1 millimeters to 20×20×10 millimeters. In yet other embodiments, the size of the product ranges from 10×10×5 millimeters to 20×20×10 millimeters. In yet other embodiments, the size of the product ranges from 20×15×10 millimeters to 20×20×10 millimeters.

In embodiments, the product has a shelf-life of at least 3 months. In other embodiments, the product has a shelf-life of at least 4 months. In other embodiments, the product has a shelf-life of at least 5 months. In other embodiments, the product has a shelf-life of at least 6 months. In other embodiments, the product has a shelf-life of at least 7 months. In other embodiments, the product has a shelf-life of at least 8 months. In other embodiments, the product has a shelf-life of at least 9 months. In other embodiments, the product has a shelf-life of at least 10 months. In other embodiments, the product has a shelf-life of at least 11 months. In other embodiments, the product has a shelf-life of at least 12 months. In other embodiments, the product has a shelf-life of greater than 12 months.

In some embodiments, the product has a caloric density of 1 to 9 calories per gram of the product. In some embodiments, the product has a caloric density of 2 to 9 calories per gram of the product. In some embodiments, the product has a caloric density of 3 to 9 calories per gram of the product. In some embodiments, the product has a caloric density of 4 to 9 calories per gram of the product. In some embodiments, the product has a caloric density of 5 to 9 calories per gram of the product. In some embodiments, the product has a caloric density of 6 to 9 calories per gram of the product. In some embodiments, the product has a caloric density of 7 to 9 calories per gram of the product. In some embodiments, the product has a caloric density of 8 to 9 calories per gram of the product. In some embodiments, the product has a caloric density of 9 to 9 calories per gram of the product.

In some embodiments, the product has a caloric density of 1 to 9 calories per gram of the product. In some embodiments, the product has a caloric density of 1 to 8 calories per gram of the product. In some embodiments, the product has a caloric density of 1 to 7 calories per gram of the product. In some embodiments, the product has a caloric density of 1 to 6 calories per gram of the product. In some embodiments, the product has a caloric density of 1 to 5 calories per gram of the product. In some embodiments, the product has a caloric density of 1 to 4 calories per gram of the product. In some embodiments, the product has a caloric density of 1 to 3 calories per gram of the product. In some embodiments, the product has a caloric density of 1 to 2 calories per gram of the product.

In some embodiments, the product has a caloric density of 2 to 9 calories per gram of the product. In some embodiments, the product has a caloric density of 3 to 8 calories per gram of the product. In some embodiments, the product has a caloric density of 4 to 7 calories per gram of the product. In some embodiments, the product has a caloric density of 5 to 6 calories per gram of the product.

In some embodiments, the product has a protein-energy ratio of 10% to 50%. In some embodiments, the product has a protein-energy ratio of 10% to 40%. In some embodiments, the product has a protein-energy ratio of 10% to 30%. In some embodiments, the product has a protein-energy ratio of 10% to 25%. In some embodiments, the product has a protein-energy ratio of 10% to 20%. In some embodiments, the product has a protein-energy ratio of 10% to 15%. In some embodiments, the product has a protein-energy ratio of 15% to 50%. In some embodiments, the product has a protein-energy ratio of 20% to 50%. In some embodiments, the product has a protein-energy ratio of 25% to 50%. In some embodiments, the product has a protein-energy ratio of 30% to 50%. In some embodiments, the product has a protein-energy ratio of 35% to 50%. In some embodiments, the product has a protein-energy ratio of 40% to 50%.

In some embodiments, the product has a protein-energy ratio of 15% to 40%. In some embodiments, the product has a protein-energy ratio of 20% to 35%. In some embodiments, the product has a protein-energy ratio of 25% to 30%.

In some embodiments, the product has a fat-energy ratio of 0% to 20%. In some embodiments, the product has a fat-energy ratio of 5% to 20%. In some embodiments, the product has a fat-energy ratio of 10% to 20%. In some embodiments, the product has a fat-energy ratio of 15% to 20%. In some embodiments, the product has a fat-energy ratio of 0% to 15%. In some embodiments, the product has a fat-energy ratio of 0% to 10%. In some embodiments, the product has a fat-energy ratio of 0% to 5%.

In some embodiments, the product has a fat-energy ratio of 20% to 60%. In some embodiments, the product has a fat-energy ratio of 20% to 50%. In some embodiments, the product has a fat-energy ratio of 20% to 45%. In some embodiments, the product has a fat-energy ratio of 20% to 40%. In some embodiments, the product has a fat-energy ratio of 20% to 35%. In some embodiments, the product has a fat-energy ratio of 20% to 30%. In some embodiments, the product has a fat-energy ratio of 20% to 25%.

In some embodiments, the product has a fat-energy ratio of 25% to 60%. In some embodiments, the product has a fat-energy ratio of 30% to 60%. In some embodiments, the product has a fat-energy ratio of 35% to 60%. In some embodiments, the product has a fat-energy ratio of 40% to 60%. In some embodiments, the product has a fat-energy ratio of 45% to 60%. In some embodiments, the product has a fat-energy ratio of 50% to 60%.

In some embodiments, the product has a fat-energy ratio of 30% to 50%. In some embodiments, the product has a fat-energy ratio of 25% to 45%. In some embodiments, the product has a fat-energy ratio of 30% to 35%.

In some embodiments, the product has a nutritional profile as shown in Table 2 below:

TABLE 2

| Parameter | Amount per 100 grams |
| --- | --- |
| Energy | 400-500 calories |
| Protein | 10-20 grams |
| Carbohydrate | 40-50 grams |
| Fat | 20-30 grams |
| Saturated Fat | 2-10 grams |
| Dietary Fiber | 5-10 grams |

In some embodiments, the calorie content of the product ranges from 200 calories to 700 calories per 100 grams of the product. In some embodiments, the calorie content of the product ranges from 300 calories to 700 calories per 100 grams of the product. In some embodiments, the calorie content of the product ranges from 400 calories to 700 calories per 100 grams of the product. In some embodiments, the calorie content of the product ranges from 500 calories to 700 calories per 100 grams of the product. In some embodiments, the calorie content of the product ranges from 600 calories to 700 calories per 100 grams of the product.

In some embodiments, the calorie content of the product ranges from 200 calories to 600 calories per 100 grams of the product. In some embodiments, the calorie content of the product ranges from 200 calories to 500 calories per 100 grams of the product. In some embodiments, the calorie content of the product ranges from 200 calories to 400 calories per 100 grams of the product.

In some embodiments, the calorie content of the product ranges from 300 calories to 600 calories per 100 grams of the product. In some embodiments, the calorie content of the product ranges from 400 calories to 500 calories per 100 grams of the product.

In some embodiments, the protein content of the product ranges from 5 grams to 40 grams per 100 grams of the product. In some embodiments, the protein content of the product ranges from 5 grams to 35 grams per 100 grams of the product. In some embodiments, the protein content of the product ranges from 5 grams to 30 grams per 100 grams of the product. In some embodiments, the protein content of the product ranges from 5 grams to 25 grams per 100 grams of the product. In some embodiments, the protein content of the product ranges from 5 grams to 20 grams per 100 grams of the product. In some embodiments, the protein content of the product ranges from 5 grams to 15 grams per 100 grams of the product. In some embodiments, the protein content of the product ranges from 5 grams to 10 grams per 100 grams of the product.

In some embodiments, the protein content of the product ranges from 10 grams to 40 grams per 100 grams of the product. In some embodiments, the protein content of the product ranges from 15 grams to 40 grams per 100 grams of the product. In some embodiments, the protein content of the product ranges from 20 grams to 40 grams per 100 grams of the product. In some embodiments, the protein content of the product ranges from 25 grams to 40 grams per 100 grams of the product. In some embodiments, the protein content of the product ranges from 30 grams to 40 grams per 100 grams of the product. In some embodiments, the protein content of the product ranges from 35 grams to 45 grams per 100 grams of the product.

In some embodiments, the product is substantially free of fat. In yet other embodiments, the product is free of fat.

In some embodiments, the fat content of the product ranges from 1 grams to 10 grams per 100 grams of the product. In some embodiments, the fat content of the product ranges from 1 grams to 8 grams per 100 grams of the product. In some embodiments, the fat content of the product ranges from 1 grams to 40 grams per 6 grams of the product. In some embodiments, the fat content of the product ranges from 1 grams to 4 grams per 100 grams of the product. In some embodiments, the fat content of the product ranges from 1 grams to 2 grams per 100 grams of the product. In some embodiments, the fat content of the product ranges from 2 grams to 10 grams per 100 grams of the product. In some embodiments, the fat content of the product ranges from 4 grams to 10 grams per 100 grams of the product. In some embodiments, the fat content of the product ranges from 6 grams to 10 grams per 100 grams of the product. In some embodiments, the fat content of the product ranges from 8 grams to 10 grams per 100 grams of the product.

In some embodiments, the fat content of the product ranges from 10 grams to 40 grams per 100 grams of the product. In some embodiments, the fat content of the product ranges from 10 grams to 35 grams per 100 grams of the product. In some embodiments, the fat content of the product ranges from 10 grams to 30 grams per 100 grams of the product. In some embodiments, the fat content of the product ranges from 10 grams to 25 grams per 100 grams of the product. In some embodiments, the fat content of the product ranges from 10 grams to 20 grams per 100 grams of the product. In some embodiments, the fat content of the product ranges from 10 grams to 15 grams per 100 grams of the product.

In some embodiments, the fat content of the product ranges from 15 grams to 40 grams per 100 grams of the product. In some embodiments, the fat content of the product ranges from 20 grams to 40 grams per 100 grams of the product. In some embodiments, the fat content of the product ranges from 25 grams to 40 grams per 100 grams of the product. In some embodiments, the fat content of the product ranges from 30 grams to 40 grams per 100 grams of the product. In some embodiments, the fat content of the product ranges from 35 grams to 40 grams per 100 grams of the product.

In some embodiments, the fat content of the product ranges from 20 grams to 40 grams per 100 grams of the product. In some embodiments, the fat content of the product ranges from 25 grams to 35 grams per 100 grams of the product.

In some embodiments, the carbohydrate content of the product ranges from 30 grams to 60 grams per 100 grams of the product. In some embodiments, the carbohydrate content of the product ranges from 30 grams to 50 grams per 100 grams of the product. In some embodiments, the carbohydrate content of the product ranges from 30 grams to 45 grams per 100 grams of the product. In some embodiments, the carbohydrate content of the product ranges from 30 grams to 40 grams per 100 grams of the product. In some embodiments, the carbohydrate content of the product ranges from 30 grams to 35 grams per 100 grams of the product.

In some embodiments, the carbohydrate content of the product ranges from 35 grams to 60 grams per 100 grams of the product. In some embodiments, the carbohydrate content of the product ranges from 40 grams to 60 grams per 100 grams of the product. In some embodiments, the carbohydrate content of the product ranges from 45 grams to 60 grams per 100 grams of the product. In some embodiments, the carbohydrate content of the product ranges from 50 grams to 60 grams per 100 grams of the product. In some embodiments, the carbohydrate content of the product ranges from 55 grams to 60 grams per 100 grams of the product.

In some embodiments, the carbohydrate content of the product ranges from 40 grams to 50 grams per 100 grams of the product.

Acoustic Crispiness Test Procedure

Collect ten samples of the test product. Cut each of the ten samples using a craft knife blade (A/CKB, Stable Micro Systems, Godalming, UK). The test settings for the craft knife blade are: test speed 1 mm/s, target strain of 90% and trigger force of 12 g. During the cutting, use an Acoustic Envelope Detector ("AED") (A/RAED, Stable Micro Systems, Godalming, UK) to collect acoustic data. The test settings for the AED are: gain of 1 (equal to 6 dB), switched to filter and signal. The microphone of the AED (Type 4188-A-021, Brüel & Kjær, Nærum, Denmark) is calibrated to 94 dB and 114 dB using a sound calibrator (Type 4231, Brüel & Kjær, Nærum, Denmark). The microphone is positioned 2 cm from the center of the craft knife blade at an angle of −45° from the flat edge of the blade during testing. Collect the acoustic data at 500 points/second. Collect acoustic data for each the ten samples of the test product. Compile and analyze the acoustic data to identify the average number of acoustic peaks of the ten samples. The average number of acoustic peaks corresponds to the acoustic peak count of the test product.

Force Crispiness Test Procedure

Collect ten samples of the test product. Cut each of the ten samples using a craft knife blade (A/CKB, Stable Micro Systems, Godalming, UK). The test settings for the craft knife blade are: test speed 1 mm/s, target strain of 90% and trigger force of 12 g. During the cutting, use a TA-XT2 Texture Analyser (Stable Micro Systems, Godalming, UK) with a 5 kg load cell to measure force. Collect the force data at 500 points/second. Collect force data for each the ten samples of the test product. Compile and analyze the force data to identify the average peak force of the ten samples. The average peak force corresponds to the peak fracture force of the test product.

Methods of Making Products

The following are non-limiting methods of making the ready-to-eat, shelf stable product detailed herein.

In embodiments, the inner filling is pre-treated and ready to eat using at least one method such as extrusion, roasting, and/or pre-cooking. In embodiments, the inner filling is extruded, roasted and/or pre-cooked sufficiently to dehydrate the inner filling. In some embodiments, the inner filling may be milled. In the embodiments, the inner filling is fine milled.

In other embodiments, the outer shell is formed using extrusion or the like. In the embodiments, the outer shell is formed by first mixing ingredients such as the legume-based flour and water and then extruding to form a pillow. In yet other embodiments, the outer shell is formed by mixing the ingredients and co-extruding with the inner filling. In embodiments, the inner filling may be pumped into the outer shell at a forming stage of the outer shell. In the embodiment, at the extrusion die where the outer shell is formed into a hollow tube, the inner filling is pumped inside of the outer shell, through the inner die, by a positive displacement pump or equivalent. In the embodiment, the filled tube is later crimped and cut into the final product.

In some embodiments, the process of extrusion and pocket crimping/cutting is based, at least in part, on the inner filling composition and/or rheology.

In some embodiments, the product is then spray coated with oil and/or seasoning. In other embodiments, the seasoning is extruded with the outer shell.

Figure 2:
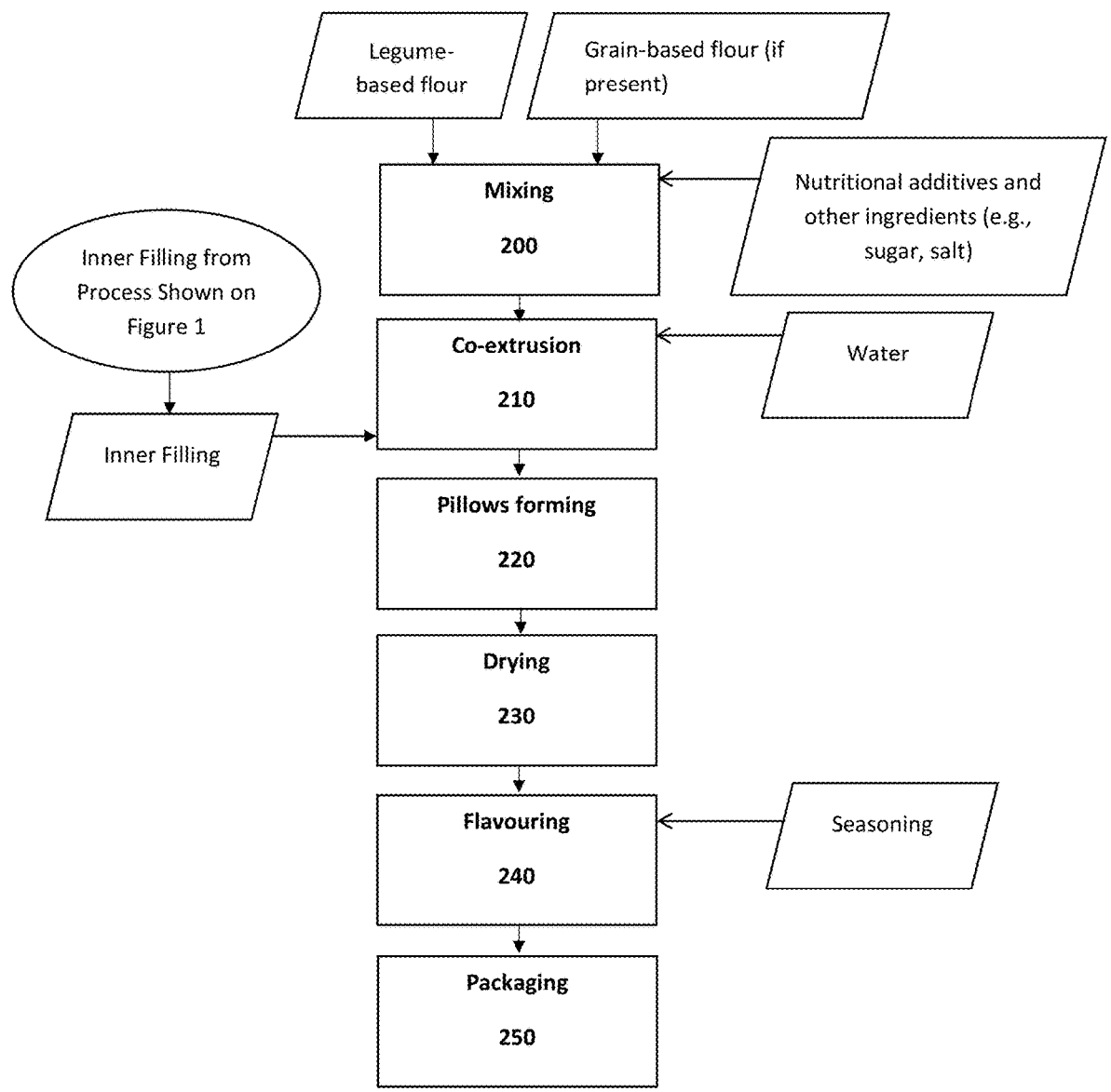
FIG. 2 illustrates features of some embodiments of the present invention.

A non-limiting example of a method of making the product according to some embodiments of the present invention is shown in FIGS. 1 and 2. FIG. 1 shows a non-limiting method of forming the inner filling. The first step of the method includes extrusion cooking 100 the legume flour and water. The extrusion cooking step 100 is conducted in an extruder with an end plate temperature of about 130 degrees Celsius to about 170 degrees Celsius. The residence time in the extruder is about 15 seconds to about 60 seconds. In the embodiments of the product where the inner filling includes cereal/grain flours, the cereal/grain flour is added at extrusion cooking step 100. The product of step 100 is then dried at a temperature of about 110 degrees Celsius to about 150 degrees Celsius for about 5 minutes to about 20 minutes in a drying step 110 to form a dehydrated water/flour mixture. The mixture is then size-reduced to an average particle size of less than about 200 micrometers in a milling step 120. The milled particles are then mixed with fat, nutritional additives and other ingredients such as sugar and/or salt until homogeneous in a mixing step 130 to form the inner filling.

FIG. 2 shows a non-limiting method of forming the outer shell and the final product. The first step of the method includes mixing 200 legume flours with nutritional additives and other ingredients such as sugar and salt. In the embodiments of the product where the outer shell includes cereal/grain flours, the cereal/grain flour is added at mixing step 200. The product of step 200 is then coextruded with water and the inner filling in a coextrusion step 210 to form a filled ribbon/tube. The coextrusion step 210 is conducted in an extruder with an end plate temperature of about 130 degrees Celsius to about 170 degrees Celsius. The residence time in the extruder is about 15 seconds to about 60 seconds. The filled ribbon/tube is then formed into individual pillow shaped pieces in pillow forming step 220. The individual shaped pieces are then dried at a temperature of about 110 degrees Celsius to about 150 degrees Celsius for about 5 minutes to about 20 minutes in a drying step 230. The dried pieces are then uniformly coated with oil and/or seasoning at flavouring step 240. The resultant seasoned product is then added to barrier packaging at packaging step 250 to from a packaged product.

Non-Limiting Examples

Figure 3:
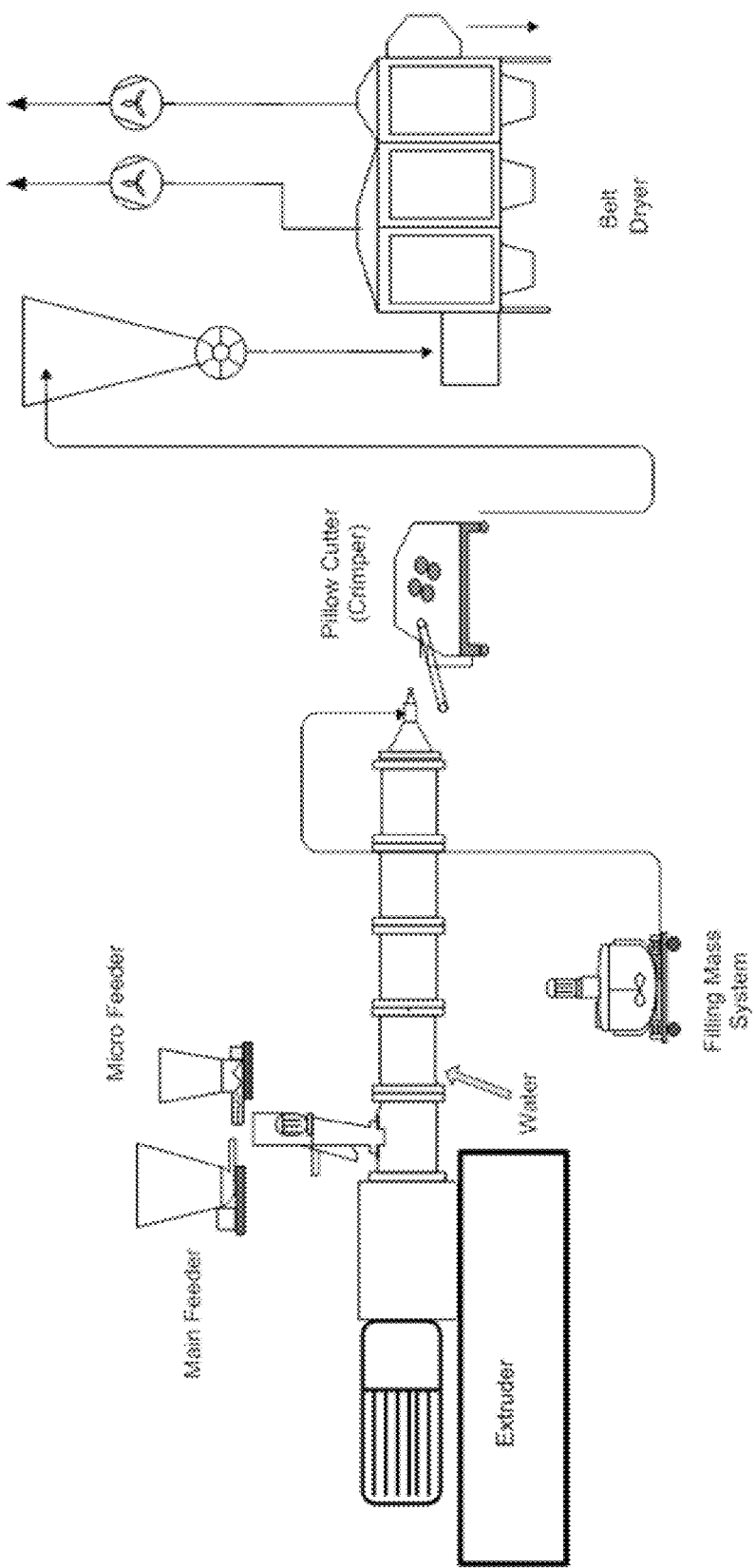
FIG. 3 illustrates features of some embodiments of the present invention.

Non-limiting examples of products according to embodiments of the present invention are detailed below. Examples 1-29 were produced using the process detailed in FIG. 3. The examples included chickpea, green pea, yellow pea, pinto bean and peanut flours. Moreover, in some examples, red millet or rice was also added. The composition of the Example 1-25 are shown in Table 3 below:

TABLE 3

| Example | Outer Shell Composition | Inner Filling | Range of Water % Added During Processing |
|---|---|---|---|
| 1 | 100% chickpea | Unfilled | 10%-13% |
| 2 | 66.7% chickpea 33.3% green pea | Unfilled | 12% |
| 3 | 100% pinto bean flour | Unfilled | Not determined |
| 4 | 60% pinto bean flour 40% green pea flour | Unfilled | 15%-18% |
| 5 | 100% pinto bean flour | Filled | Not determined |
| 6 | 60% pinto bean flour 40% green pea flour | Filled | Not determined |
| 7 | 25% pinto bean flour 75% green pea flour | Filled | Not determined |

TABLE 3-continued

| Example | Outer Shell Composition | Inner Filling | Range of Water % Added During Processing |
|---|---|---|---|
| 8 | 100% pinto bean flour | Filled | Not determined |
| 9 | 60% pinto bean flour 40% green pea flour | Filled | Not determined |
| 10 | 25% pinto bean flour 75% green pea flour | Filled | Not determined |
| 11 | 60% pinto bean flour 40% chickpea | Filled | Not determined |
| 12 | 25% pinto bean flour 75% chickpea | Filled | Not determined |
| 13 | 75% green pea flour 25% rice | Filled | Not determined |
| 14 | 85% green pea flour 15% rice | Filled | Not determined |
| 15 | 100% green pea flour | Filled | Not determined |
| 16 | 100% green pea flour | Filled | Not determined |
| 17 | 100% pinto bean flour | Unfilled | Not determined |
| 18 | 95% pinto bean flour 5% vitamin-based additive | Unfilled | Not determined |
| 19 | 75% chickpea 25% rice | Filled | Not determined |
| 20 | 10% pinto bean flour 67.5% chickpea 22.5% rice | Filled | Not determined |
| 21 | 30% pinto bean flour 52.5% chickpea 17.5% rice | Filled | Not determined |
| 22 | 100% chickpea | Filled | 10%-12% |
| 23 | 50% chickpea 50% red millet | Filled | 10%-12% |
| 24 | 85% green pea 15% red milled | Filled | 10%-12% |
| 25 | 100% peanut flour | Filled | 20% |

Figure 4A:
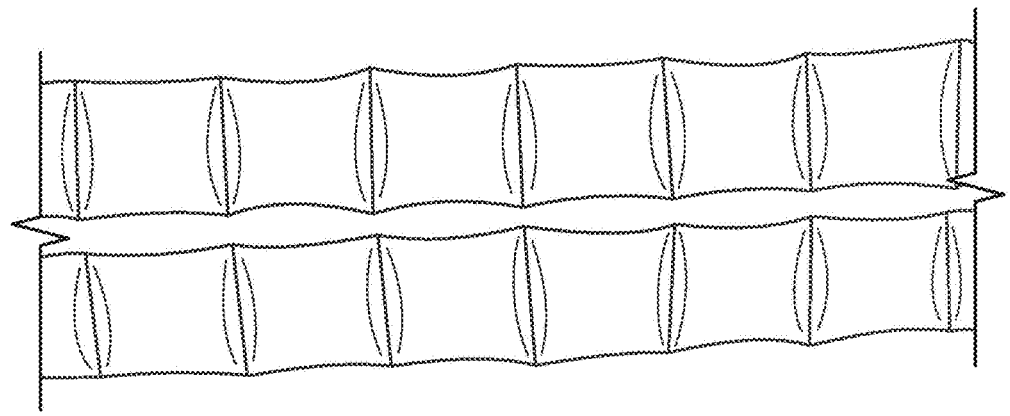
FIG. 4A illustrates features of some embodiments of the present invention.
Figure 4B:
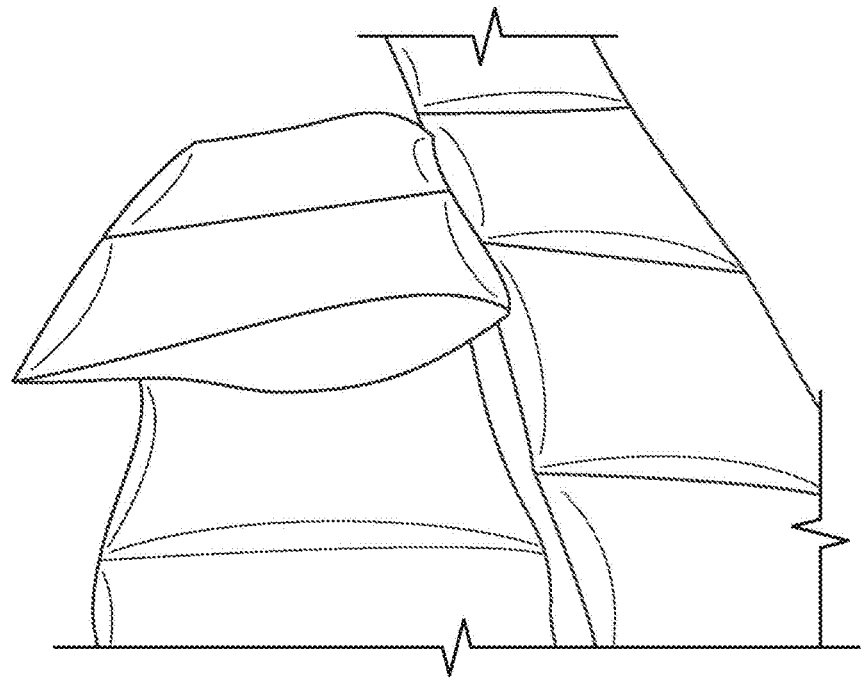
FIG. 4B illustrates features of some embodiments of the present invention.
Figure 5A:
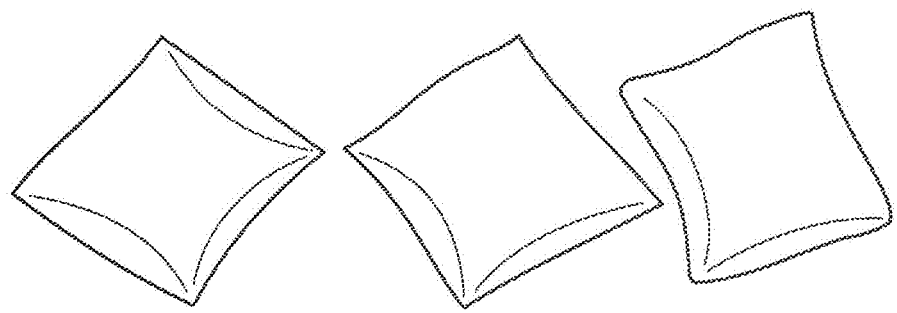
FIG. 5A illustrates features of some embodiments of the present invention.
Figure 5B:
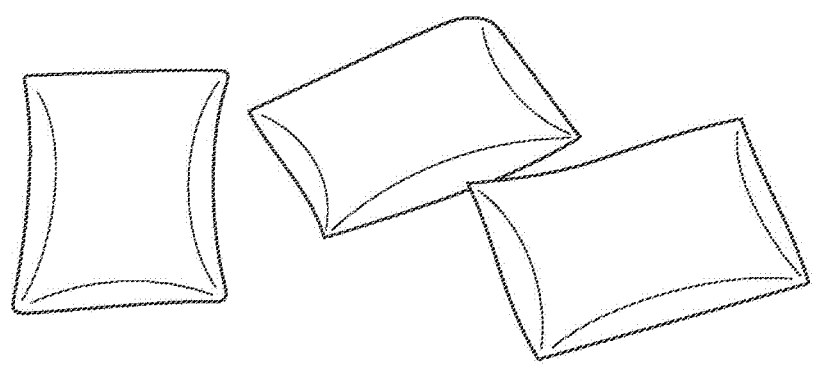
FIG. 5B illustrates features of some embodiments of the present invention.
Figure 5C:
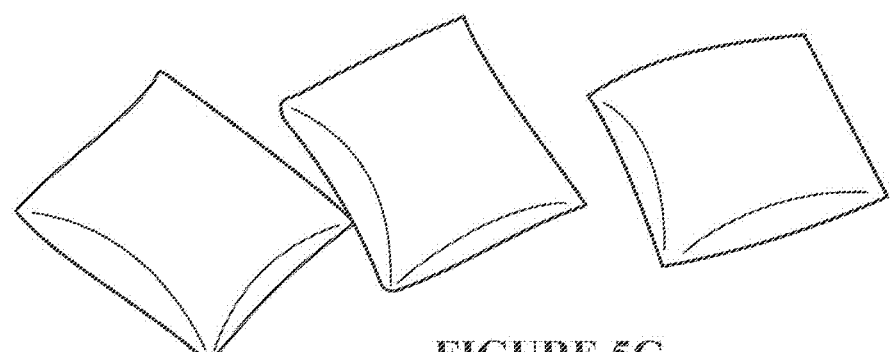
FIG. 5C illustrates features of some embodiments of the present invention.

Images of Example 1 are shown in FIGS. 4A and 4B. Images of Examples 22-24 are shown in FIGS. 5A, 5B, and 5C.

Example 26 is a product formed from pinto bean and yellow pea. Example 26 exhibits the characteristics shown in Table 4 below:

TABLE 4

| Description | by weight /100 g | |
|---|---|---|
| Energy (cal) - EU | 393.7 | cal |
| Calories From Fat (Total) | 114.3 | cal |
| Protein | 19.6 | g |
| Carbohydrate Total | 39.6 | g |
| Sugars (Mono & Di-saccharides) Total | 3.7 | g |
| Fat Total | 12.7 | g |
| Fat Saturates Total | 5.6 | g |
| Trans Fatty Acids Total | 0.08 | g |
| Cholesterol | 0.11 | mg |
| Fibre Dietary Total AOAC | 21.2 | g |
| Sodium | 26.7 | mg |
| Calcium | 109 | mg |
| Salt Equivalent | 0.07 | g |
| Ash | 4.4 | g |
| Moisture | 5.8 | g |
| Solids | 94.2 | g |

Example 27 is a non-limiting example of an inner filling based on yellow pea having the composition shown in Table 5:

TABLE 5

| Ingredient | Amount per 100 kg | Unit |
| --- | --- | --- |
| Yellow Pea Flour Extruded | 61.4 | kg |
| Veg Fat (palm oil) | 32.8 | kg |
| Sugar Icing | 5.0 | kg |
| Vitamin Additives | 0.6 | kg |
| Salt Fine Bag | 0.2 | kg |

Example 28 is a non-limiting example of an inner filling based on roasted flours having the composition shown in Table 6:

TABLE 6

| Ingredient | Amount per 100 kg | Unit |
| --- | --- | --- |
| Peanut Flour Roasted | 31 | kg |
| Chickpea flour roasted | 31 | kg |
| Veg Fat (palm oil) | 32.2 | kg |
| Sugar Icing | 5 | kg |
| Vitamin Additives | 0.6 | kg |
| Salt Fine Bag | 0.2 | kg |

Example 29 is a non-limiting example of an outer shell based on pinto bean flour and yellow pea flour having the composition shown in Table 7:

TABLE 7

| Ingredient | Amount per 100 kg | Unit |
| --- | --- | --- |
| Pinto Bean Flour | 51.8 | kg |
| Yellow Pea Flour | 34.6 | kg |
| Water | 13.5 | kg |
| Vitamin Additives | 0.1 | kg |

A non-limiting example 30 of an embodiment of the present invention formed by the process described in FIGS. 1 and 2 has the composition shown in Table 8 below:

TABLE 8

| Ingredient | Weight Percent |
| --- | --- |
| Yellow Pea Flour | 62.3 |
| Water | 11.6 |
| Vitamin Additives | 0.4 |
| Palm Oil | 11.5 |
| Vegetable Oil | 6 |
| Seasoning | 6 |
| Emulsifier | 0.4 |
| Salt | 0.1 |
| Sugar | 1.7 |

The weight percent of the outer shell, inner filling, oil coating and seasoning coating of non-limiting example 30 are shown in Table 9 below:

TABLE 9

| Ingredient | Weight Percent |
| --- | --- |
| Shell | 43 |
| Filling | 43 |
| Vegetable Oil | 7 |
| Seasoning | 7 |

The weight percent of each ingredient in the outer shell and the inner filling of non-limiting example 30 is shown in Tables 10 and 11 below:

TABLE 10

| Outer Shell | |
| --- | --- |
| Ingredient | Weight Percent |
| Yellow Pea Flour | 83.7 |
| Filling | 16 |
| Vitamin Additive | 0.3 |

TABLE 11

| Inner Filling | |
| --- | --- |
| Ingredient | Weight Percent |
| Yellow Pea Flour | 62 |
| Palm Oil | 31.2 |
| Sugar | 5 |
| Emulsifier | 1 |
| Vitamin Additive | 0.7 |
| Salt | 0.2 |

The water content of each of the inner filling and the outer shell of non-limiting example 30 was analyzed with the results shown in Table 12 below. The outer shell was also confirmed to be crispy.

TABLE 12

| Ingredient | Water Content (%) |
| --- | --- |
| Outer Shell | 3 |
| Inner Filling | 1.9 |

Figure 6:
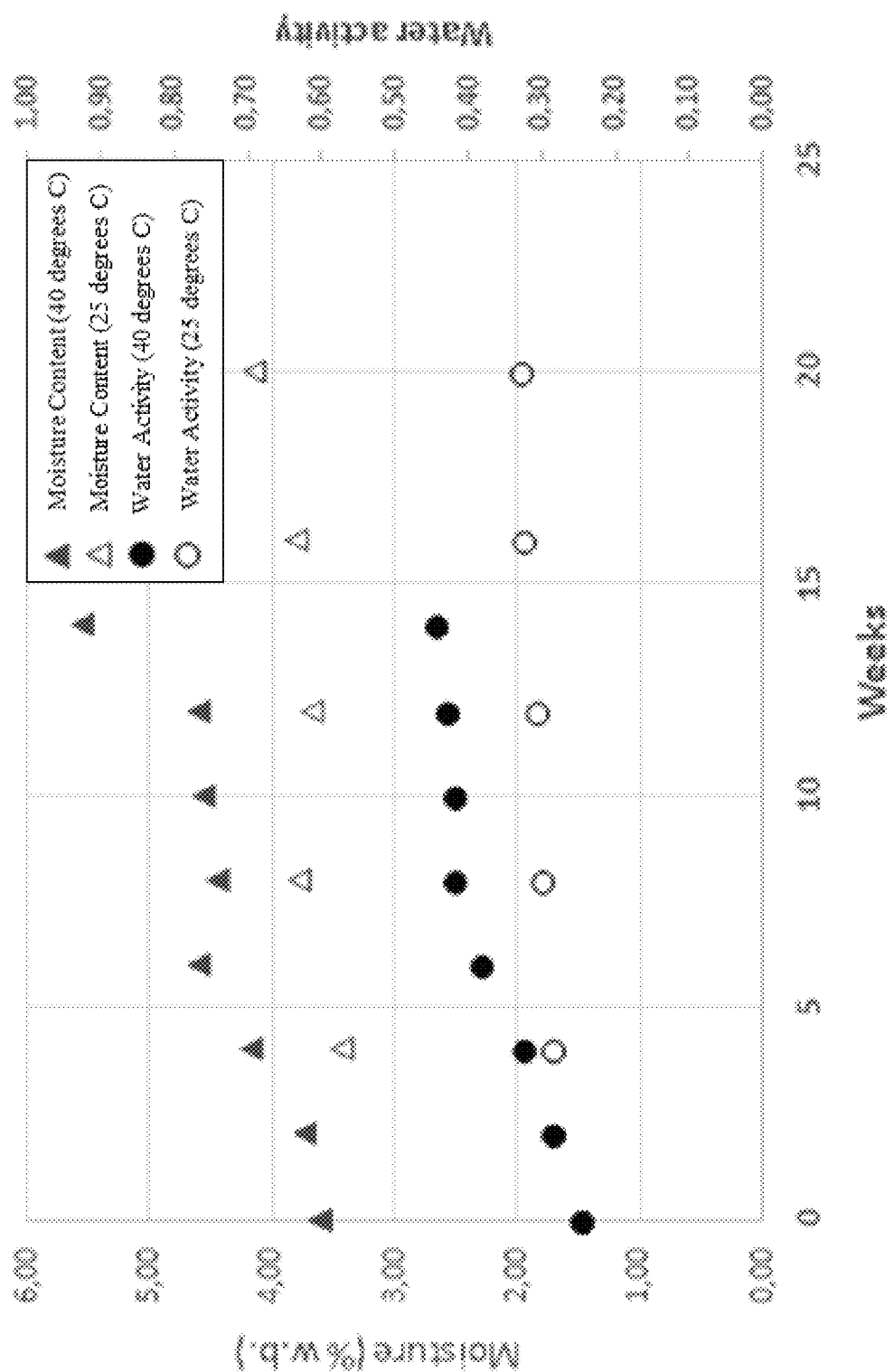
FIG. 6 illustrates features of some embodiments of the present invention.

The product of example 30 was also analyzed to determine the stability of the packaged product over time. The product was subjected to two relevant storage conditions of 40 degrees Celsius and 70% relative humidity and 25 degrees Celsius and 60% relative humidity for 20 weeks. The moisture content and water activity of each product was measured at periodic intervals over the testing duration. The results of the testing are illustrated in FIG. 6. The increase in the water activity and moisture content of the test products follow a step-wise progression rather than a linear one as shown by the intermediate plateau between 6-12 weeks for the water activity and between 8-14 weeks for the moisture content.

The product of example 30 was further analyzed for crispiness. The product and a comparative example—TRESOR® "Chocolat Lait" breakfast cereal sold in France (where TRESOR® is a registered trademark of Kellogg North America Company, Battle Creek, Mich.) were stored at 21 degrees Celsius and a relative humidity of 44% for two weeks and then analyzed for moisture content and crispiness using the Acoustic Crispiness Test Procedure and the Force Crispiness Test Procedure. The moisture contents of the product of example 30 and the comparative example were about 5%. The crispiness test results for the product of example 30 and the comparative example are shown in Table 13.

TABLE 13

| Parameter | Example 30 | Comparative Example |
|---|---|---|
| Peak Fracture Force (grams) | 2,368 grams | 1,032 grams |
| Acoustic Peak Count | 26 | 4 |

A non-limiting example 31 of an embodiment of the present invention formed by the process described in FIGS. 1 and 2 has the composition shown in Table 14 below

TABLE 14

| Ingredient | Weight Percent |
|---|---|
| Legume-Based Flour | 65-75 |
| Fats and Oils | 15-25 |
| Seasoning | 5-10 |
| Sugar | 1-3 |
| Emulsifier | 0.25-0.5 |
| Vitamin Mix | 0.25-0.5 |
| Salt | 0.1-0.2 |

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

The invention claimed is:

1. A product comprising:
   a crispy outer shell comprising:
      at least one first legume selected from the group consisting of chickpea, green pea, yellow pea, black eyed peas, pinto bean, kidney bean, black bean, mung bean, adzuki bean, fava bean, edamame, green lentil, red lentil, black lentil, lupin, soya and combinations thereof, and
      at least one first additive selected from the group consisting of vitamins and minerals;
      wherein the at least one additive is not a part of the at least one first legume; and
   a creamy inner filling comprising:
      at least one second legume selected from the group consisting of chickpea, green pea, yellow pea, black eyed peas, pinto bean, kidney bean, black bean, mung bean, adzuki bean, fava bean, soya, edamame, green lentil, red lentil, black lentil, lupin and combinations thereof, and
      at least one second additive selected from the group consisting of vitamins and minerals;
      wherein the at least one second additive is not a part of the at least one second legume;
      wherein at least one of the crispy outer shell and the creamy inner filling comprises grain-based flour or cereal; and
      wherein the product is a shelf-stable ready-to-eat food; and
      wherein the product has a shelf life of at least 3 months.

2. The product of claim 1, wherein the at least one first additive and the at least one second additive are selected from the group consisting of iron, vitamins A, B1, B2, B6, B12, C, D, D3, folic acid, thiamin, riboflavin, niacin, zinc and combinations thereof.

3. The product of claim 1, wherein the at least one first legume is a pulse.

4. . The product of claim 1, wherein the at least one first legume is soya.

5. The product of claim 1, wherein the at least one first additive is selected from the group consisting of Vitamin B6, niacin, iron, zinc, and combinations thereof.

6. The product of claim 1, wherein the at least one second additive is selected from the group consisting of Vitamins A, D3, B1, B2, C, B12, folic acid and combinations thereof.

7. The product of claim 1, wherein the at least one second legume is a pulse.

8. The product of claim 1, wherein the at least one second legume is soya.

9. The product of claim 1, wherein the at least one first legume and the at least one second legume are the same.

10. The product of claim 1, wherein the at least one first legume and the at least one second legume are different.

11. The product of claim 1, wherein a bulk density of the product is 0.1 kg/liter to 2 kg/liter.

12. The product of claim 1, wherein a shape of the product is selected from the group consisting of triangular, rectangular, square, and rhomboid.

13. The product of claim 1, wherein the product is free of at least one of high fructose corn syrup, dairy-based components, enzymes or gluten.

14. The product of claim 1, wherein the outer shell is 40 weight percent to 80 weight percent of the product.

15. The product of claim 1, further comprising an oil layer and wherein the oil layer coats at least a portion of the outer shell.

16. The product of claim 1, wherein a water content of the outer shell is at least 50% greater than a water content of the filling.

* * * * *